United States Patent
Hoell et al.

(10) Patent No.: US 9,601,974 B2
(45) Date of Patent: Mar. 21, 2017

(54) ARMATURE ASSEMBLY APPARATUS

(71) Applicant: SIEMENS AKTIENGESELLSCHAFT, München (DE)

(72) Inventors: Kenneth Damgaard Hoell, Vejle (DK); Jakob Mikkelsen, Brande (DK); John Krath Pedersen, Herning (DK); Martin Bach Soerensen, Herning (DK)

(73) Assignee: SIEMENS AKTIENGESELLSCHAFT, München (DE)

( * ) Notice: Subject to any disclaimer, the term of this patent is extended or adjusted under 35 U.S.C. 154(b) by 0 days.

(21) Appl. No.: 14/644,255

(22) Filed: Mar. 11, 2015

(65) Prior Publication Data
US 2015/0188396 A1 Jul. 2, 2015

Related U.S. Application Data

(62) Division of application No. 13/739,561, filed on Jan. 11, 2013, now Pat. No. 9,015,925.

(30) Foreign Application Priority Data

Jan. 11, 2012 (EP) .................... 12150741

(51) Int. Cl.
| | |
|---|---|
| B23P 19/00 | (2006.01) |
| H02K 15/00 | (2006.01) |
| H02K 15/02 | (2006.01) |
| H02K 7/18 | (2006.01) |

(52) U.S. Cl.
CPC ............ *H02K 15/00* (2013.01); *H02K 15/02* (2013.01); *H02K 7/1838* (2013.01); *H02K 2213/12* (2013.01); *Y02E 10/725* (2013.01); *Y10T 29/49009* (2015.01); *Y10T 29/49012* (2015.01); *Y10T 29/49069* (2015.01); *Y10T 29/49073* (2015.01); *Y10T 29/53143* (2015.01)

(58) Field of Classification Search
CPC ......... Y10T 29/49009; Y10T 29/49012; Y10T 29/53143; Y10T 156/1744; Y10T 29/49826; H02K 15/02; H02K 15/00
USPC ... 29/732, 50, 508, 596, 598, 604, 606, 609, 29/734, 738; 310/91, 216.049, 254.1
See application file for complete search history.

(56) References Cited

U.S. PATENT DOCUMENTS

2009/0134629 A1    5/2009   Stiesdal

FOREIGN PATENT DOCUMENTS

| CN | 101459354 A | 6/2009 |
|---|---|---|
| CN | 201735988 U | 2/2011 |
| EP | 1167754 A2 | 1/2002 |
| JP | 2007053870 | * 3/2007 |
| JP | 2007053870 A | 3/2007 |

(Continued)

*Primary Examiner* — Thiem Phan

(57) ABSTRACT

An armature assembly apparatus for assembling an armature of an electrical machine is provided. The armature assembly apparatus has an armature holding apparatus to hold a partially assembled armature such that a rotation axis of the armature is horizontal. The armature assembly apparatus has a rotating device for rotating the partially assembled armature about a rotation axis. The armature assembly apparatus also has a ring segment conveyance for conveying an armature ring segment to a mounting position relative to a free ring segment portion of the partially assembled armature.

12 Claims, 3 Drawing Sheets

(56) References Cited

FOREIGN PATENT DOCUMENTS

| | | |
|---|---|---|
| JP | 200753870 A | 9/2008 |
| WO | WO 0060719 A1 | 10/2000 |
| WO | WO 2006032969 A2 | 3/2006 |
| WO | WO 2011031165 A1 | 3/2011 |

* cited by examiner

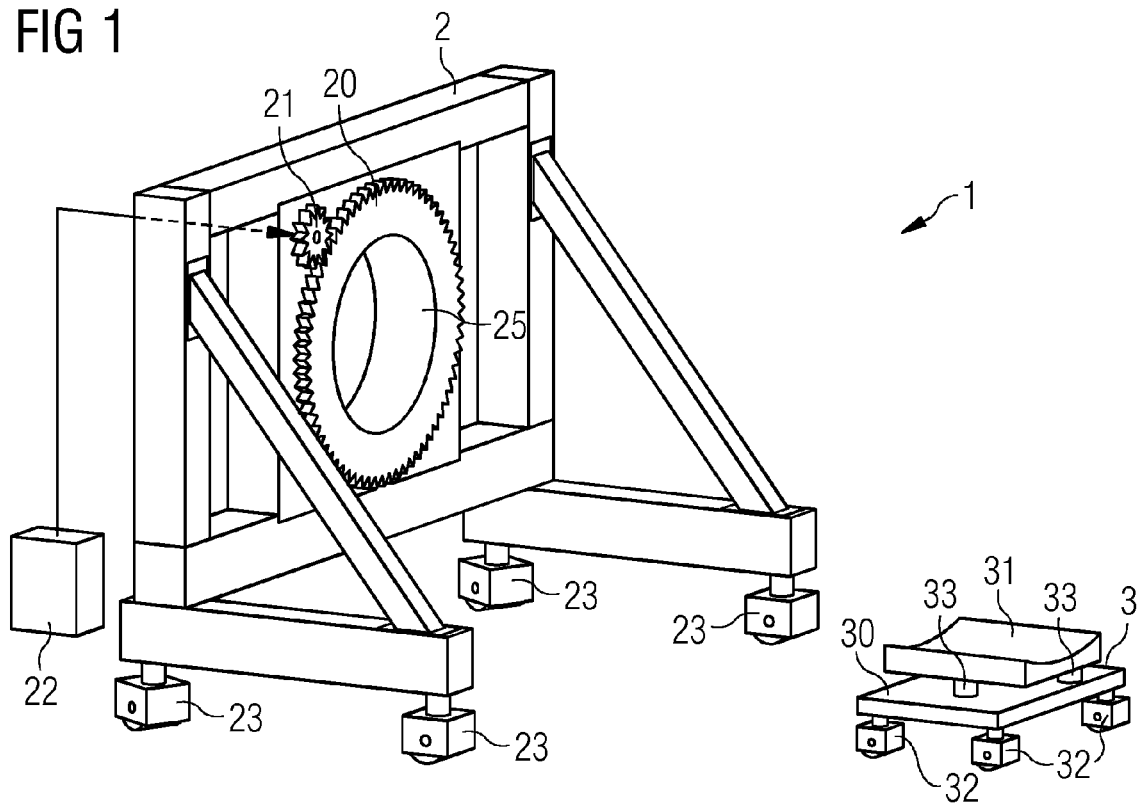
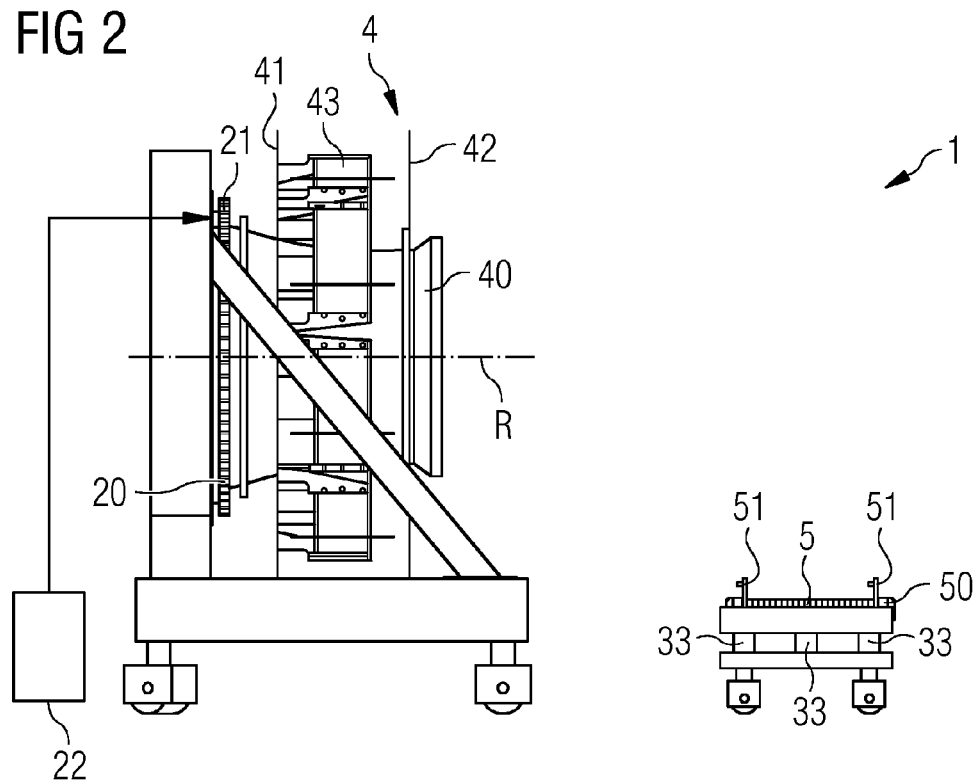

ARMATURE ASSEMBLY APPARATUS

CROSS REFERENCE TO RELATED APPLICATIONS

This application is a divisional of U.S. Ser. No. 13/739,561 filed Jan. 11, 2013 having priority to European Patent Office application No. 12150741.2 EP filed Jan. 11, 2012. Each of the applications is incorporated by reference herein in their entirety.

FIELD OF INVENTION

The application describes an armature assembly apparatus for assembling an armature of an electrical machine; an armature holding apparatus; a ring segment conveyance; and a method of assembling an armature of an electrical machine.

BACKGROUND OF INVENTION

A conventional wind turbine generally comprises a gearbox to increase the rotational speed of its generator relative to its rotor shaft and to increase the pole change frequency. A gearbox comprises many components that are subject to wear and must be maintained or replaced at intervals. Complex and expensive bearing arrangements are also required to bear the extreme loads and torque acting on the rotor shaft and the gearbox. A direct-drive wind turbine has several features over such a conventional wind turbine, whereby a major feature is that a direct-drive turbine does not require such a gearbox. A direct-drive wind turbine requires fewer parts, is less complex, and more reliable. For these reasons, demand for direct drive wind turbines is increasing.

A direct-drive generator has a relatively large diameter and many magnets of altering polarity arranged along a circumference of a field magnet arrangement—usually an outside rotor—to allow for a sufficiently high pole-change frequency. The physical dimensions and weight of such a large generator pose problems during its assembly. Handling of the heavy, unwieldy and vulnerable components is complex and time-consuming, and is also hazardous, so that strict safety measures must be adhered to. This adds considerably to the overall time and cost required for the assembly of a direct-drive generator.

For example, stator ring segments must be handled with care, but each ring segment can weigh hundreds of kilos, making it difficult to manoeuvre into position ready for mounting to a stator bedframe, which usually comprises a frontplate and a backplate mounted to a hollow stator shaft. A stator ring segment generally comprises several coil sections with windings wrapped in isolating material, and end-sections shaped to be connected to end-sections of neighbouring ring segments. Usually, a stator ring segment is transported to the partially assembled stator using a hoisting or crane, and is connected to this by cables or chains. The ring segment must be suspended in place until it is mounted to the stator bedframe. Extreme care must be taken when the ring segment is suspended during transport so that the vulnerable parts such as insulation or connectors are not damaged or bent, and so that the isolating material is not damaged. Furthermore, care must be taken to avoid damage or distortion of bedframe connecting device that are necessary for connecting the ring segment to the stator bedframe, otherwise an exact mounting is not possible. Damage to any of these elements results in expensive repair work and holds up production.

SUMMARY OF INVENTION

It is an object of the application to provide a more economical and reliable way of assembling an armature for a generator of a direct-drive wind turbine.

This object is achieved by the armature assembly of the claims; by the armature holding apparatus of the claims; by the ring segment conveyance of the claims; and by the method of the claims of assembling an armature of an electrical machine.

According to the application, the armature assembly apparatus for assembling an armature of an electrical machine comprises an armature holding apparatus realized to hold a partially assembled armature such that a rotation axis of the armature is horizontal; a rotating device for rotating the partially assembled armature about a rotation axis; and a ring segment conveyance for conveying an armature ring segment to a mounting position relative to a free ring segment portion of the partially assembled armature.

The armature holding apparatus or "assembly station" can be a frame realized to bear the weight of an assembled armature, and can also be realized to move from one point of an assembly line to another. The armature holding apparatus may also be referred to as an armature frame or armature transport frame in the following. In the armature assembly apparatus according to the application, the rotation axis of the armature is horizontal or parallel to the ground. This is in contrast to prior art assembly arrangements that involve a vertical orientation of the armature, as described in the introduction, and allows the armature to be retained in that orientation for most or all of the assembly stages of the generator. In other words, various assembly stages can be carried out to the armature as it is held in the horizontal orientation, so that lifting equipment such as cranes and hoists are not required, and the armature or armature ring segments are held securely and cannot be dropped and cannot swing against other components. A ring segment does not have to be manually hoisted or lifted into place and held while it is being secured to the armature, but can simply be brought into a mounting position relative to the free ring segment portion using the ring segment conveyance. A feature of the armature holding apparatus according to the application is that the sensitive and expensive components are effectively protected from damage, and an elastic deformation of the ring segment is avoided. Furthermore, the armature holding apparatus according to the application effectively protects an armature, primarily designed to bear the weight of the ring segments in a horizontal position, from any distortion.

According to the application, the armature holding apparatus, for use in the assembly of an armature of an electrical machine, comprises a connecting device for detachably connecting a partially assembled armature to the armature holding apparatus such that a rotation axis of the armature is horizontal; and a rotating device for rotating the partially assembled armature about a rotation axis.

According to the application, the ring segment conveyance for use in the assembly of an armature of an electrical machine comprises a support for supporting an armature ring segment; and a positioning device for bringing the armature ring segment into a mounting position relative to a free ring segment portion of a partially assembled armature.

While such a ring segment conveyance could be realized to bring an armature ring segment into position at an angle relative to the armature, for example from the side or from above, the ring segment conveyance according to the application is realized to bring a ring segment into position from below the partially assembled armature. In other words, the ring segment conveyance holds the armature ring segment in position underneath the partially assembled armature. In this way, there is no risk of the ring segment slipping or being dropped before it can be mounted to the armature.

According to the application, the method of assembling an armature of an electrical machine comprises the steps of
(A) connecting a partially assembled armature to an armature holding apparatus such that a rotation axis of the armature is horizontal;
(B) actuating a rotating device to rotate the partially assembled armature about a rotation axis of the rotating device to bring a free ring segment portion into position;
(C) conveying an armature ring segment to the partially assembled armature;
(D) controlling an adjusting device of the armature assembly apparatus to bring the armature ring segment into a mounting position on the free ring segment portion of the partially assembled armature;
(E) mounting the armature ring segment to the free ring segment portion of the partially assembled armature;
and repeating steps to until a desired number of armature ring segments have been mounted onto the armature. Of course, the sequence or order in which these steps are carried out is not limited to the order in which they are listed here.

The feature of the method according to the application is that it allows the armature to be assembled without the hazardous or time-consuming handling steps known from the prior art. A number of armature ring segments can be "lined up" ready for mounting, and as soon as one ring segment is mounted to the partially assembled armature, this can be rotated by a suitable amount so that the next ring segment can be mounted, and so on.

Embodiments and features of the application are given by the dependent claims, as revealed in the following description. Features of different claim categories may be combined as appropriate to give further embodiments not described herein.

While the windings could be mounted on a rotating component of the generator, in a direct-drive wind turbine the windings are generally arranged on a stationary stator, which is usually arranged inside the rotor, i.e. the rotor comprises an outside rotor. In the following, without restricting the application in any way, it may be assumed that the armature is a stator, and the terms "armature" and "stator" may be used interchangeably in the following. Also, without restricting the application in any way, it may be assumed that the generator is for a wind turbine. During assembly of the armature, it may be assumed that the ring segments are mounted to the exterior of the armature. It may also be assumed that an armature ring segment is a radial ring segment, i.e. the armature ring segment occupies a radial fraction of an exterior circumferential curved plane of the armature.

The expression "rotation axis of the armature" is to be understood as the axis about which a rotating part of the assembled generator will rotate. Usually, the generator exhibits rotational symmetry about its axis of rotation. The rotating part can be the armature itself, in which case the field magnet arrangement of the generator can be stationary. Alternatively, the armature itself does not rotate, as would be the case for a generator comprising a stationary armature and a rotating field magnet arrangement.

The ring segment conveyance can be any suitable conveyance for bringing a ring segment to the partially assembled stator for mounting. For example, the ring segment conveyance can be realized as a type of conveyor belt. However, an embodiment of the application, the ring segment conveyance comprises a trolley or wagon arranged on wheels or rollers so that it is freely moveable relative to the stator frame. In the following, without restricting the application in any way, the ring segment conveyance may be referred to simply as a "trolley" or "ring segment trolley".

The rotating device of the armature assembly apparatus can be realized to rotate the partially assembled armature in any suitable manner. For example it may be realized to allow the partially assembled armature to "roll" along a predefined path, so that the rotational axis of the armature is displaced in a horizontal direction parallel to the ground. However, in an embodiment of the application, the rotating device is realized to rotate the partially assembled armature about the rotation axis of the armature. In other words, the armature is not displaced laterally and is only rotated about its own axis of rotation.

The partially assembled armature could simply be suspended in place such that it can engage with the rotating device during assembly of the armature. However, an embodiment of the application, the armature holding apparatus comprises a connecting device for detachably connecting the partially assembled armature to the rotating device, so that the partially assembled armature is at all times securely fastened to the transport frame.

The rotating device can comprise any suitable apparatus or device that is realized to turn the relatively heavy armature. The rotating device comprises a meshed gear arrangement. For example such enmeshed in your arrangement can comprise one large gear wheel realized to engage with a smaller driving you really substantially larger gear wheel is arranged to accommodate a shaft of the stator. In an alternative arrangement, the meshed gear arrangement can comprise a set of helical gears, a worm and wheel arrangement, or a rack and pinion arrangement.

Such a rotating device is realized to be driven by a suitable actuating device, for example a motor such as an electric motor. The actuating device is realized to actuate the rotating device to rotate the partially assembled armature about its rotation axis. In an embodiment of the application, the rotating device is realized to rotate the partially assembled armature by a radial amount corresponding to a radial width of an armature ring segment. For example, if twelve ring segments are to be mounted to the stator bedframe, the actuating device can be realized to rotate the partially assembled stator by 30°, so that the next free ring segment portion can be brought into position ready for the next assembly step.

The armature assembly apparatus according to the application comprises some kind of adjusting device for bringing the armature ring segment into a mounting position on the free ring segment portion of the partially assembled armature. For example, the armature frame can be realized to be adjustable in the several degrees of freedom so that the partially assembled armature itself is moved relative to a stationary ring segment held on the conveyance or trolley. However, the large dimensions and considerable weight of the partially assembled armature can make this relatively difficult to achieve. In an embodiment of the application, such an adjusting device is realized as part of the trolley. In such a realisation, the armature frame can remain stationary relative to the trolley.

In a further embodiment of the application, the adjusting device or aligning device is realized to adjust the position of the armature ring segment relative to the free ring segment portion of the partially assembled armature. To this end, the adjusting device can be connected in some suitable way to a control interface or control module which can be used by a controller, human or automated, to control the adjusting device. For example, such a control module can be a handheld module connected to the adjusting device of the trolley by a cabled connection or a wireless connection. Such a control module can also be realized to issue control signals to the driving device of the trolley, so that it can be used, for example, to control the motion of the trolley over a factory floor.

The ring segment trolley comprises a supporting device or carrying bed, realized to bear the armature ring segment in an horizontal orientation underneath the armature assembly. To ensure that the ring segment is transported in a safe and secure manner, such a supporting device or carrying bed is shaped in a concave manner in keeping with the curved form of a stator ring segment. Since the stator ring segment is transported in an horizontal position, i.e. in a "lying" position, the adjusting device is realized to raise or lower the ring segment relative to the free ring segment portion of the armature assembly. In other words, an adjusting device is realized to have an vertical direction of travel.

The adjusting device can comprise any suitable moving parts that can be controlled to alter a vertical or horizontal orientation of the ring segment that is carried by the ring segments trolley. In an embodiment of the application, the adjusting device comprises a plurality of individually moveable adjusting points. The adjusting device comprises three individually moveable adjusting points, since three such individually movable adjusting points are sufficient to obtain any desired orientation of the ring segment relative to the stator bedframe. An adjusting point comprises a linear actuator such as a hydraulic cylinder and piston arrangement that can be actuated to extend or contract along its direction of travel. In one realisation, the adjusting points can be controlled simultaneously, so that the ring segment is raised or lowered evenly without altering its orientation. However, sometimes a slight adjustment may need to be made to one side or corner of the ring segment. In addition to or as an alternative to the preceding embodiment, each adjusting point can be controlled or actuated independently of the others. With such an arrangement of individually controllable adjusting points, the adjusting device can be realized to raise the armature ring segment in an upward vertical direction towards the free ring segment portion of the partially assembled armature, and can "fine tune" the position of the ring segment relative to the free ring segment portion of the stator bedframe.

The step of bringing the ring segment into position relative to the stator bedframe, so that these can be connected, can be assisted by one or more sensors. For example, a laser or sonic measurement device can be used to determine a distance between a point on the ring segment and a corresponding "target" point on the stator bedframe. Such a signal can be used by the control module or control interface and can be used as the basis for control signals sent to the adjusting points of the trolley.

BRIEF DESCRIPTION OF THE DRAWINGS

Other objects and features of the present application will become apparent from the following detailed descriptions considered in conjunction with the accompanying drawings. It is to be understood, however, that the drawings are designed solely for the purposes of illustration and not as a definition of the limits of the application.

FIG. 1 shows a perspective view of an armature assembly apparatus according to an embodiment of the application;

FIG. 2 shows a side view of the armature assembly apparatus of FIG. 1 with a partially assembled armature;

DETAILED DESCRIPTION OF INVENTION

Figure 3:
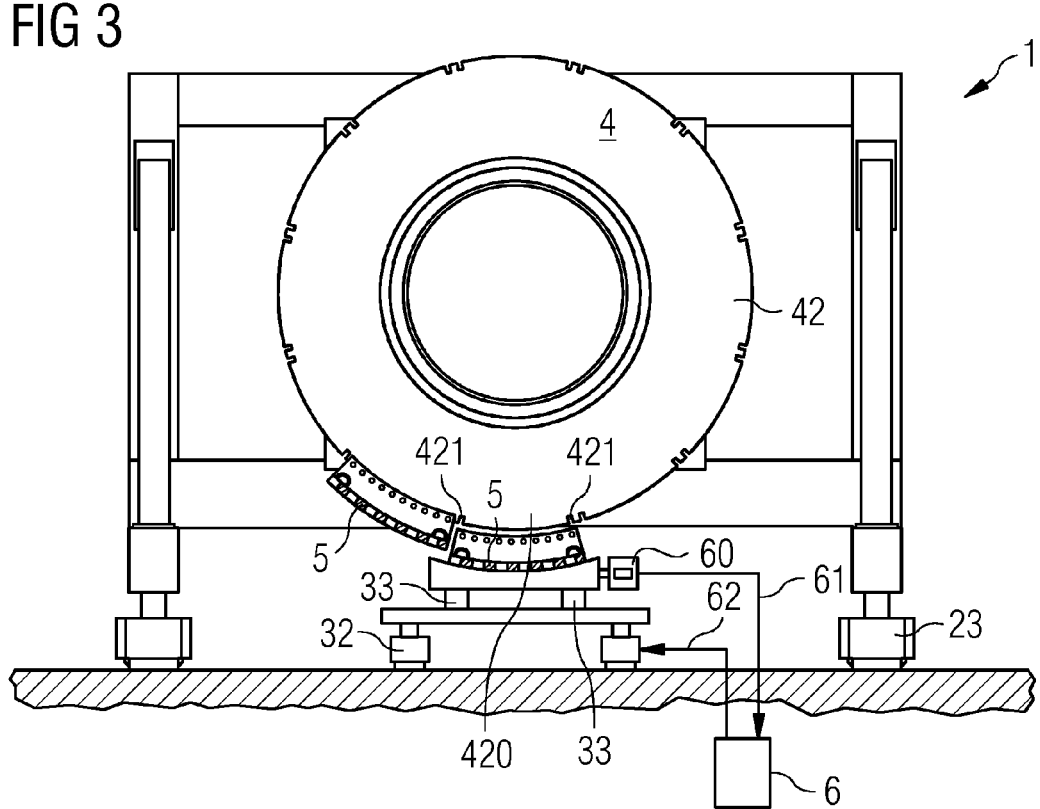
FIG. 3 shows a frontal view of the armature assembly apparatus of FIG. 1 with the partially assembled armature in a first stage of assembly.

In the diagrams, like numbers refer to like objects throughout. Objects in the diagrams are not necessarily drawn to scale.

FIG. 1 shows a perspective view of an armature assembly apparatus 1 according to an embodiment of the application. The armature assembly apparatus 1 comprises a large robust stator transport frame 2, and in this example also comprises four rollers 23 or wheels 23, one at each corner, so that the transport frame 2 can be moved from one location to another, for example in an assembly line. The transport frame 2 also comprises a turning device 20, 21, 22, in this case a set of meshed gears, wherein a large gear 20 can be moved by driving a smaller gear 21. To this end, a motor 22 or other driving device 22, indicated schematically here, can be connected to the smaller driving gear 21. The motor 22 can be mounted to the stator frame, or can be arranged elsewhere, as appropriate. Such a motor can comprise a shaft or other transmission for connecting to the driving gear 21. The large gear 20 is arranged around a hollow shaft 25 which is realized or shaped to accommodate a shaft of an armature or stator. The diagram also shows a ring segment conveyance 3 or trolley 3, which is freely movable relative to the stator transport frame 2. The ring segment trolley 3 comprises a flatbed body 30 connected to four rollers 32 or wheels 32, and a supporting device 31 shaped to accommodate a curved ring segment. This supporting device 31 is arranged on a number of linear actuators 33, which, as will be shown later, can be controlled to adjust to the position of the supporting device 31 in a vertical direction. To ensure that the trolley is correctly aligned underneath the stator assembly, it can be guided using, for example, markings on the floor.

FIG. 2 shows a side view of the armature assembly apparatus 1 of FIG. 1 with a partially assembled armature 4, referred to as the stator 4 in the following, for a generator of a direct-drive wind turbine. A bedframe of the stator 4 comprises a hollow shaft 40, a backplate 42 and a frontplate 41. The annular backplate 42 is mounted to the shaft 40 on a tower interface side, i.e. the side of the shaft that will face into the nacelle of the wind turbine. The frontplate 41 will face into the hub of the wind turbine. A cooling system 43 with components such as encasement, fan, heat exchanger, tubing etc. are arranged as indicated here in the space between the backplate 42 and the frontplate 41. In a generator for a direct-drive wind turbine, the stator bedframe can comprise 5 m or more in diameter, and the distance between the frontplate and backplate can comprise about 1.5 m to 2 m.

The diagram also shows the ring segment trolley 3 with a stator ring segment 5 lying in the supporting device 31 ready for mounting to the stator bedframe 4. A stator ring segment 5 comprises copper windings 50 arranged on a bedframe interface 51. The bedframe interface 51 is realized to be mounted to an outer rim of the frontplate 41 and backplate 42, as will be explained in the following. In the diagram, no stator ring segments have yet been mounted to the stator bedframe 4.

FIG. 3 shows a frontal view of the armature assembly apparatus of FIG. 1 with the partially assembled stator 4 in a first stage of assembly. Here, one ring segment 5 has already been mounted. A second ring segment 5 is in place on the supporting device 31 of the ring segment trolley 3. A controller 6, here indicated schematically, is used to drive the ring segment trolley 3, for example by sending control signals 62 to a motor or other driving device (not shown here) of the ring segment trolley 3. One or more sensors 60, positioned at some suitable position on the ring segment trolley 3, can send measurement signals 61 to the controller 6, so that this can react accordingly. The sensor 60 can detect the relative position of the ring segment 5 relative to the stator frontplate 41 and backplate 42, for example by using guiding device 420 of the stator frontplate 41 and backplate 42 as reference points. The controller 6 can send appropriate adjustment signals 62 to the trolley 3 to adjust the position of the ring segment 5 relative to the stator frontplate 41 and backplate 42 until the position of the stator ring segment 5 is considered satisfactory. Since the ring segment 5 is only elevated while it rests on the cradle of the trolley 3, an elastic deformation of the ring segment 5 is avoided. Furthermore, this horizontal position is the same position that will be taken by the ring segment 5 during operation of the wind turbine. Since the stator plates 41, 42 are primarily designed to bear the weight of the ring segments 5 in a horizontal position, these are also effectively protected from any distortion.

Figure 4:
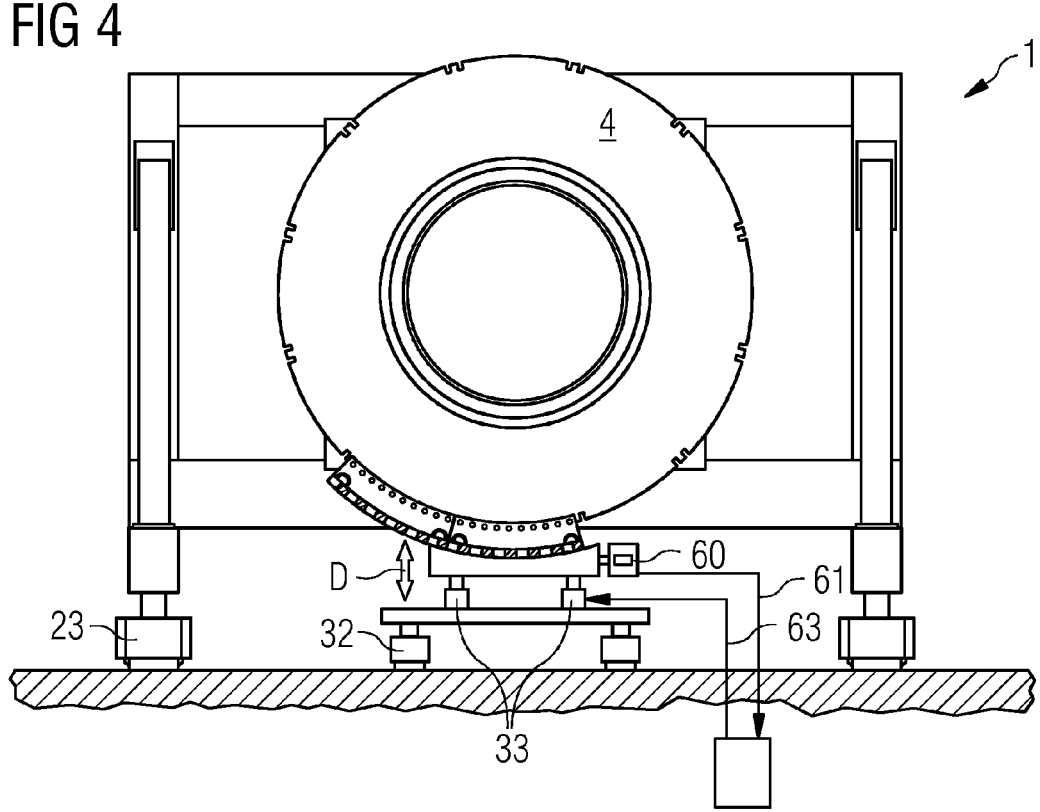
FIG. 4 shows a frontal view of the armature assembly apparatus of FIG. 1 with the partially assembled armature in a second stage of assembly.

FIG. 4 shows a frontal view of the armature assembly apparatus of FIG. 1 with the partially assembled stator 4 in a second stage of assembly. This diagram shows a next stage in the mounting process. The controller 6 can send adjustment signals 63 to the linear actuators 33 of the ring segment trolley 3 so that the supporting device 31 can be raised to the required height in a vertical direction D as indicated in the diagram. Again, a sensor 60 can deliver measurement signals 61 to the controller 6 so that this can respond by issuing appropriate control signals 63. A bedframe interface 51 of the stator ring segment 5 is designed so that, once it has been brought into a mounting position relative to the frontplate 41 and backplate 42, it can be slotted into place. This can be achieved by appropriate control signals 62, 63 issued by the controller 6.

Figure 5:
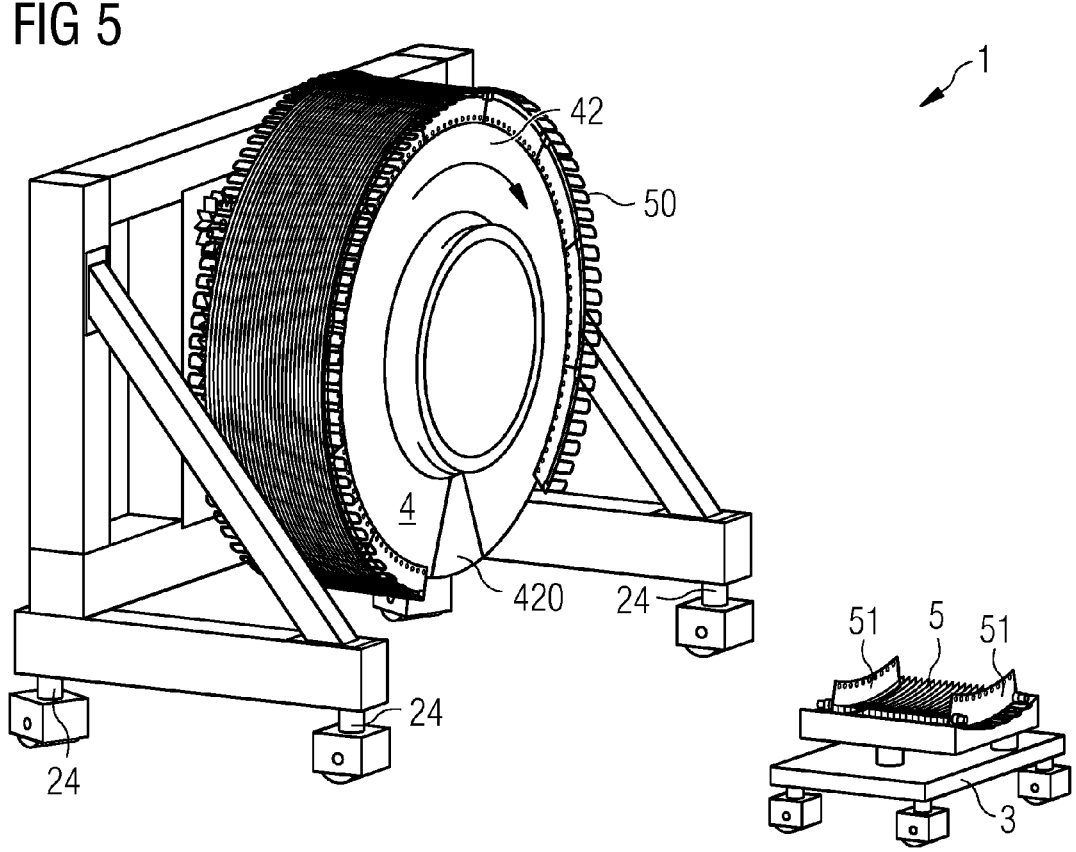
FIG. 5 shows a frontal view of the armature assembly apparatus of FIG. 1 with the partially assembled armature in a third stage of assembly.

FIG. 5 shows a frontal view of the armature assembly apparatus of FIG. 1 with the partially assembled armature in a third stage of assembly. In this diagram, almost all of the ring segments 5 have mounted onto the stator bedframe 4, 41, 42. The diagram clearly shows another stator ring segment 5 with its windings wrapped, for example, in a fibreglass band to protect the windings, arranged on the trolley 3 ready for mounting. The stator bedframe 4 has been rotated in the direction indicated so that the second-last free ring segment portion 420 is brought into a suitable position for mounting of the next stator ring segment 5.

Once the stator bedframe 4, 41, 42 has been filled with ring segments 5, the stator transport frame 2 can be moved to a next assembly position by the rollers 24 mounted on the four corners of the transport frame 2.

Although the present application has been disclosed in the form of embodiments and variations thereon, it will be understood that numerous additional modifications and variations could be made thereto without departing from the scope of the application.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. An armature assembly apparatus for assembling an armature of an electrical machine, comprising:
    an armature holding apparatus for holding a partially assembled armature so that a rotation axis of the armature is horizontal;
    a rotating device for rotating the partially assembled armature about the rotation axis;
    an armature ring segment; and
    a ring segment conveyance for conveying the armature ring segment to a mounting position relative to a free ring segment portion of the partially assembled armature,
    wherein the rotating device comprises a meshed gear arrangement comprising a set of meshed gears, wherein a large gear is moved by driving a smaller gear.

2. The armature assembly apparatus according to claim 1, wherein the rotating device is realized to rotate the partially assembled armature about its rotation axis.

3. The armature assembly apparatus according to claim 1, wherein the armature holding apparatus comprises a connecting device for detachably connecting the partially assembled armature to the rotating device.

4. The armature assembly apparatus according to claim 1, wherein the rotating device is realized to rotate the partially assembled armature by a radial amount corresponding to a radial width of a free ring segment portion.

5. The armature assembly apparatus according to claim 1, further comprising an adjusting device for bringing the armature ring segment into the mounting position on the free ring segment portion of the partially assembled armature.

6. The armature assembly apparatus according to claim 5, further comprising a control interface for controlling the adjusting device.

7. The armature assembly apparatus according to claim 1, wherein the armature holding apparatus comprises an actuating device for actuating the rotating device to rotate the partially assembled armature about the rotation axis.

8. The armature assembly apparatus according to claim 1, further comprising,
    a support for supporting an armature ring segment; and
    a positioning device for bringing the armature ring segment into a mounting position relative to a free ring segment portion of a partially assembled armature.

9. The armature assembly apparatus according to claim 8, further comprising an adjusting device for adjusting the mounting position of the armature ring segment relative to the free ring segment portion of the partially assembled armature.

10. The armature assembly apparatus according to claim 8, wherein the adjusting device comprises a plurality of individually controllable adjusting points.

11. The armature assembly apparatus according to claim 10, wherein one of the adjusting points comprises a linear actuator.

12. The armature assembly apparatus according to claim 8, wherein the adjusting device is realized to raise the armature ring segment in an upward vertical direction towards the free ring segment portion of the partially assembled armature.

\* \* \* \* \*